Aug. 16, 1927.
E. DAVIS
1,639,631
SHOCK ABSORBER AND REBOUND CHECK
Filed Sept. 10, 1925
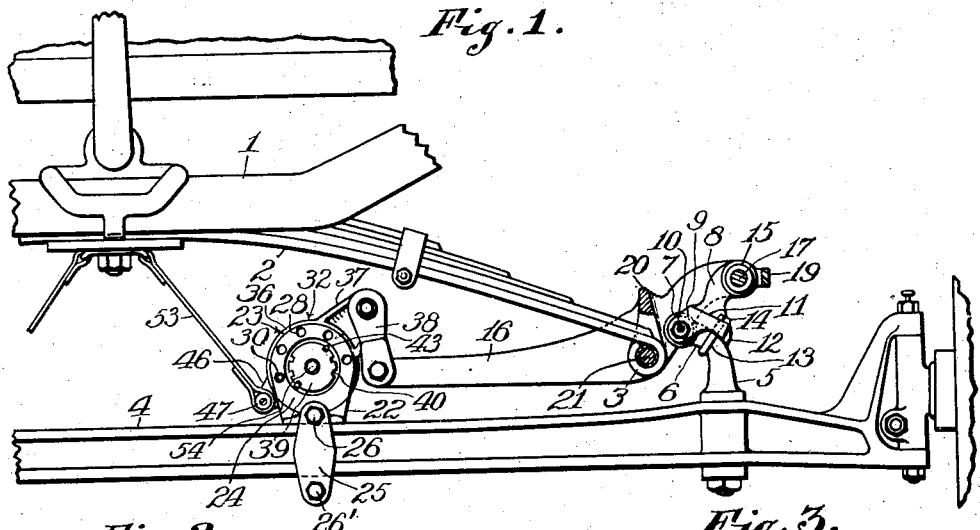
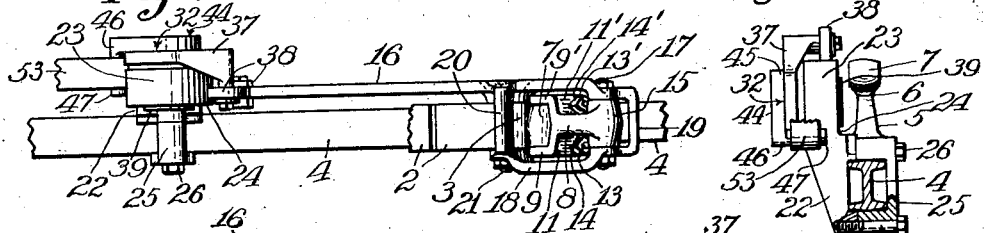
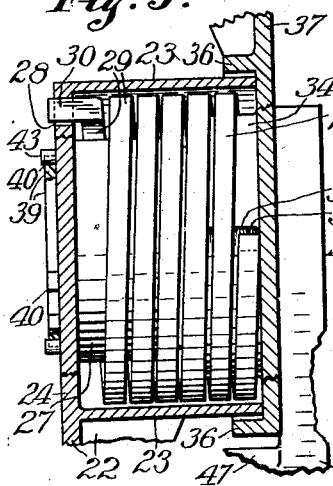
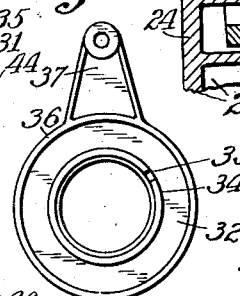
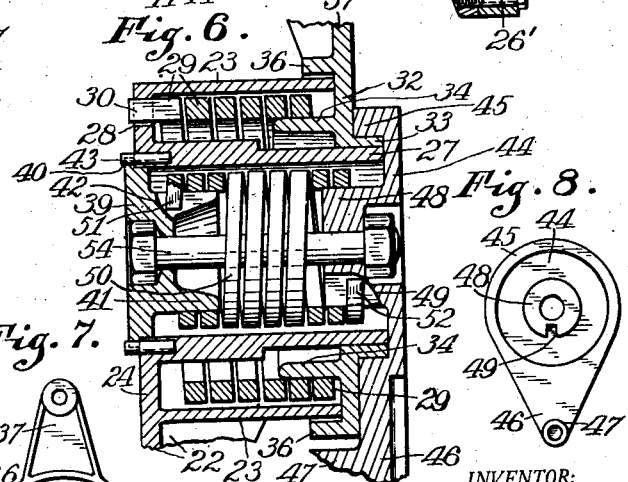
INVENTOR:
Emerson Davis,
BY
E. T. Silvius,
ATTORNEY.

Patented Aug. 16, 1927.

1,639,631

UNITED STATES PATENT OFFICE.

EMERSON DAVIS, OF INDIANAPOLIS, INDIANA, ASSIGNOR OF ONE-HALF TO GEORGE P. RUTH, OF INDIANAPOLIS, INDIANA.

SHOCK ABSORBER AND REBOUND CHECK.

Application filed September 10, 1925. Serial No. 55,547.

This invention relates to a shock absorber and rebound check combined that is designed to improve the action of the springs of motor-vehicles and especially the half-elliptic springs with which low priced motor-vehicles are equipped, the invention having reference more particularly to improved spring mountings and their application to existing automobile parts.

An object of the invention is to provide improved spring mountings and shock absorber structures, which shall be so constructed and combined as to improve the practical efficiency of motor-vehicle springs which lack proper length and proportions to insure satisfactory results in operation.

Another object is to provide an improved shock absorber which shall be of such construction as to eliminate objectionable side sway of the body of the motor-vehicle, reduce the rocking of the body and insure easy and comfortable riding in the body, consequently reducing liability of injury to occupants of motor-vehicles when operating on rough roads at high speeds.

A further object is to provide a structurally unitary shock absorber and rebound check for automobiles, which shall be so constructed as to efficiently co-operate in effecting the desired results, and shall operate in a smooth and steady manner so as to eliminate jerky action, and which shall have few and simple parts so as to not be costly, and which may readily be applied to existing motor-vehicle structure without requiring alterations thereof, and applicable by the user without requiring expert assistance; an aim being to provide apparatus of the above-mentioned character which shall be strong and reliable and also durable and economical in use.

With the above-mentioned and other objects in view, the invention consists in a shock absorber having novel construction and functions, and having a novel perch-extending device and adapters tending to increase the effective length of the half-elliptic type of motor-vehicle spring, the invention including a rebound check appliance combined with the shock absorber in a novel manner; and, the invention consists also further in the novel parts, and in the combinations and arrangements of parts, as hereinafter particularly described and further defined in the claims appended hereto.

Referring to the drawings, Figure 1 is a fragmentary front elevation of well-known automobile structure to which the invention is applied, a number of parts being broken away to expose details of construction; Fig. 2 is a top plan of the more important portion of Fig. 1; Fig. 3 is a transverse section of the front axle bar of the motor-vehicle to which parts of the invention are applied; Fig. 4 is a fragmentary section, approximately horizontal, clearly illustrating structural details; Fig. 5 is a sectional elevation showing details of spring mountings on an enlarged scale; Fig. 6 is a central section of the spring mountings on an enlarged scale in which internal parts are clearly exposed; Fig. 7 is a plan view of one of the parts of the shock absorber structure; and, Fig. 8 is a plan view of one of the parts of the rebound check structure.

Similar reference characters in the different figures of the drawings indicate corresponding elements or features of construction herein referred to in detail.

In the drawings the numeral 1 indicates a familiar part of a motor-vehicle frame which is directly secured upon the middle portion of a front spring 2 which has shackle eyes 3 on its ends, 4 indicating the front axle bar to which perches are secured whereby to support the spring, each perch comprising a main portion 5, a neck portion 6 and a head portion 7, the neck portion being curved so as to extend inwardly or each towards the other. The perches are usually very tightly secured to the axle bar and may be removed but usually not readily. One of the particular purposes of the invention is to obtain the benefit of a reversed perch without entailing the difficulties attending the removal and reversing of the perch.

In carrying out the objects of the invention a perch extender is provided which adapts the invention to be applied to the existing perch, and it comprises a stem 8 having jaw blades 9 and 9' that embrace the head 7 and are secured thereto by means of a bolt 10, the jaw blades having base shoulders 11 and 11' respectively at opposite sides of the stem. The stem has a saddle portion 12 that is seated upon the curved portion 6 of the perch, and preferably is rigidly secured thereto by means of a U-bolt embracing the portion 6 and having bolt portions 13 and 13′ extending through the saddle portion and having nuts 14 and 14′ thereon engaging the shoulders. The stem 8 has a head 15 thereon similar to the head 7, the stem 8 leaning outwardly so that the head 15 is supported slightly higher and also farther outward than the head of the perch. A lever 16 of novel form and arrangement is provided which is connected adjacent to one of its ends to the head 15 by means of a pivot bolt 17. The lever has a side bar 18 suitably fixed at one end thereto, preferably by means of a tie bar 19 integrally connected with the lever and the side bar, the bar being suitably connected to the pivot bolt. Preferably a tie bar 20 is cast integrally with the lever and the side bar so as to be above the spring eye 3 which is supported by means of a pivot bolt 21 connected to the lever and the side bar.

For yieldingly supporting the opposite end of the lever 16 a bracket 22 is provided which is adapted to be secured rigidly to one side of the axle bar and it has a circular casing 23 integral therewith, the casing having an annular end plate 24 integral therewith and with the bracket, the bracket being secured in place by means of a clamp 25 and cap screws 26 and 26′. The bracket is placed at a suitable point intermediately of the perch and middle portion of the axle bar, so as to be in proximity to the end of the lever 16. The end plate 24 has a hollow cylindrical guide 27 integral therewith that extends concentrically relatively to the casing 23 and is slightly longer than the casing. The plate 24 has a suitable number of apertures 28 therein arranged in a circle adjacent to the casing. A coil spring 29 is arranged in the casing and has a lateral lug 30 integral with one end thereof that is inserted in one of the apertures, the opposite end of the spring coil having an inwardly extending lug 31 integral therewith. An annular hub plate 32 is adapted to be guided against the edge of the casing 23 and preferably has a hub flange 33 on its outer side that is rotatively guided on the cylindrical guide 27. The hub plate has a guide ring 34 on its inner side that extends into the spring coil and has a slot 35 therein receiving the lug 31, enabling the hub plate to put the spring under tension. Preferably the hub plate has a ring 36 thereon that extends about a portion of the casing 23, and the hub plate has a lever arm 37 integral therewith to which a stiff link 38 is pivotally connected, the link being pivotally connected with the lever 16. The spring is so wound as to tend to force the lever arm 37 upwardly in opposition to the tendency of the lever 16 to pull it downwardly.

The rebound check or snubber structure is economically combined in the spring housing of the shock absorber and comprises a core plate 39 which is inserted in the annular end plate 24 and has a flange portion extending outward against the outer face of the end plate, and is provided with notches 40, the inner side of the core plate having a stub core 41 thereon in which is a slot 42. The plate 24 has a pin or pins 43 inserted therein to be received in the notches 40 whereby to hold the core plate in position when rotatively adjusted. A hub plate 44 is arranged against the edges of the guide 27 and 33 and has a rim flange 45 thereon that extends about the hub 33 to rotatively guide the hub plate, the plate having a lever arm 46 thereon provided with a wrist pin 47. The plate 44 has a central stub core 48 thereon that has a peripheral slot 49 therein. A coil spring 50 is arranged within the cylindrical guide 27 and extends about the stub cores 41 and 48, one end of the spring coil having a lug 51 integral therewith that extends inwardly and into the slot 42, the opposite end of the coil having an inwardly extending lug 52 projecting into the slot 49. The spring 50 is so wound as to tend to force the arm 46 downwardly and hold taut a flexible link or strap 53 which is connected at one end with the wrist pin 47 and has its opposite end suitably connected substantially to the middle portion of the frame member 1 and the spring 2. The hub plates 32 and 44 are maintained in place for proper operation by means of a bolt 54 suitably connected with the core plate 39 and the stub core 48 so as to permit rotary movement of the hub plates.

In practical use, as the motor-vehicle is operated on a rough road and the axle bar is thrust upward the sudden rise of the perch is not directly transmitted to the spring 2, but indirectly by means of the lever 16 which at first pulls down the lever arm 37 against the tension of the spring 29, resulting in a relatively gentle movement of the end of the spring 2. In certain cases when the body of the motor-vehicle is suddenly forced upward the movement is gradually checked by means of the strap 53 and the spring 50. Under a heavy load the spring 2 bears heavily on the lever 16 and pushes downward more or less against the tension of the spring 29, affording easy riding under varying conditions.

What is claimed as new is:

1. A shock absorber including an adapter having a base jaw to be secured to and have gravity support upon a spring perch and having also a stem directly above the jaw provided with a pivot head; a controllable lever pivoted to the pivot head and provided with a pivot directly to support a main spring, and a controlled spring to yieldingly support and control the lever.

2. A shock absorber including a gravity balanced perch-extender having pivot head, a lever connected at one end to the pivot head and provided with a pivot intermediately of its ends to support a main spring, a tension spring to be adjustably anchored, and means pivotally to connect the tension spring with the opposite end of the lever to support it.

3. A shock absorber having a housing and two coil springs therein, one of the springs being diametrically the smaller and arranged within the other, one end of each of the springs being anchored to the housing, and two levers pivotally supported on the housing and having operative connection with the springs respectively.

4. A shock absorber including a perch-extender, a casing, a coil spring secured at one end to the casing, an arm pivotally supported on the casing and having connection with the opposite end of the spring, a link connected to the arm, and a lever pivotally connected to the perch-extender and to the link and having a pivot to support a spring.

5. A shock absorber having a housing and two levers pivotally supported on the housing to operate on opposite sides thereof and two coil springs anchored in the housing, one of the springs being connected with one of the levers to force it upwardly, the other of the springs being connected with the remaining lever to force it downwardly.

6. A shock absorber including a lever having a pivot for its support at one end and also a pivot to support a main spring, a housing having a bracket to rigidly support it, an arm pivotally supported on the housing and having connection with the opposite end of the lever, and a spring connected to the housing and the arm and tensioned to yieldingly support the lever.

7. A shock absorber including a lever having a perch-extender pivoted to one end thereof to be secured upon a spring perch, the lever being provided with a pivot at a distance from the end to support a main spring, a housing having a base provided with a clamp to secure it to an axle, a coil spring in the housing and connected at one end thereto, a hub rotatively supported on the housing and connected to the opposite end of the coil spring, the hub having an arm thereon, and a stiff link pivotally connected to the arm and the opposite end of the lever.

8. A shock absorber and rebound check including a lever having a pivot to support a main spring, an adapter having means to rigidly support it on a spring perch and also means to pivotally support one end of the lever, a cylindrical casing having means to secure it to an axle bar, two coil springs guided in the casing and anchored at one end to one end of the casing, two hubs rotatively guided on the opposite end of the casing and connected to the opposite end of the springs respectively, each hub having an arm rigidly connected thereto, a stiff link pivotally connected to one of the hub arms and to the opposite end of the lever, and a flexible link connected to the other of the hub arms.

9. In a shock absorber, an adapter comprising a base having jaw blades to be bolted to a curved spring perch, the base having a saddle portion fitted to and adapted to seat by gravity upon the neck portion of the perch, a stem rigidly connected to and extending upward above the top of the base and having a head thereon to pivotally support a shock absorber lever, and means to co-operate with said neck portion to secure said base and saddle portion to the neck portion.

10. In a shock absorber, the combination, with a lever having intermediate of its ends a pivot to support a main spring, and a spring and mounting therefor independent of the main spring to yieldingly support one end of the lever, of an adapter comprising a normally upright stem having a head pivotally connected to the opposite end of the lever, the stem having a base and saddle portion to be seated by gravity upon a curved spring perch neck and having also jaw blades to be bolted to the perch, and means to rigidly secure said saddle portions to the neck of the perch.

11. In a shock absorber, the combination with a spring and support therefor, of a lever to be supported at one end by means of the spring, the lever having a pivot intermediate of its ends to support a main spring, and an upright adapter having pivotal connection with the opposite end of the lever for its support, the adapter being provided with a base and saddle portion to be supported directly upon a curved spring perch neck by gravity force and jaws thereon adapted to be bolted to the head of the perch.

12. In a shock absorber, a lever having a pivot bolt to support a main spring and having also a tie bar above the bolt integrally connected to the lever, the lever having also an end tie bar integrally connected with one end thereof, the opposite end of the lever being adapted to be yieldingly supported, the lever having also a side bar integrally connected to said tie bars and receiving said bolt, and a pivot bolt connected to the lever and to said side bar adjacent to said end tie bar to pivotally support the adjacent end of the lever.

13. In a shock absorber, the combination, with a lever to support a main spring and having a pivotal support at one end thereof, of a cylindrical casing having a base to rigidly support it, one end of the casing having an end plate provided with a series of apertures, a coil spring guided in the casing and having lugs on the opposite ends thereof, one of the lugs extending into one of said apertures, a hub rotatively guided on the opposite end of the casing and having a slot receiving the remaining one of said lugs, the hub having also an arm thereon, and a stiff link pivotally connected to said arm and to the opposite end of said lever.

14. In a shock absorber, the combination of a cylindrical casing having a base to rigidly support it, a core plate arranged in one end of the casing for rotative adjustment and having a stub core rigidly fixed thereto, the stub core having a peripheral slot in its end, a coil spring guided on said stub core and having a lug on one end thereof extending into said slot, the spring having also a lug on its opposite end, a hub rotatively guided on the opposite end of the casing and provided with a stub core extending into the opposite end of the spring and having a slot receiving the lug on said end, said hub having also an arm thereon, a flexible link connected to the arm, and a retaining bolt extending through said stub cores and connected therewith to retain said hub on the casing.

15. In a shock absorber and rebound check, the combination of a casing and a base, a clamp connected to the base, a hollow cylindrical guide and a stub core rigidly connected with one end of the casing, the core within the guide, a main coil spring in the casing outside the guide and anchored to the casing, a smaller coil spring within the guide and anchored to the core, a hub rotatively mounted on the guide and having a connection with the main coil spring, the hub having an arm integral therewith, a stiff link pivoted to the arm, a lever pivoted at one end to the link and having a pivotal support at its opposite end, the lever having a pivot to support a main spring, and a hub rotatively mounted on said guide and having an arm thereon provided with a flexible link, the last described hub having a stub core connected with the smaller coil spring.

In testimony whereof, I affix my signature on the 5th day of September, 1925.

EMERSON DAVIS.